United States Patent [19]

Parasin

[11] Patent Number: 5,165,816
[45] Date of Patent: Nov. 24, 1992

[54] TONGUE AND GROOVE PROFILE

[75] Inventor: Alexander V. Parasin, Vancouver, Canada

[73] Assignee: Council of Forest Industries, North Vancouver, Canada

[21] Appl. No.: 657,585

[22] Filed: Feb. 15, 1991

[51] Int. Cl.$^5$ .......................... F16B 11/00; E04F 15/04
[52] U.S. Cl. .................................. 403/334; 403/381; 403/345; 52/595
[58] Field of Search ............... 403/381, 334, 364, 333, 403/375, 345, 361; 52/595, 593, 589

[56] References Cited

U.S. PATENT DOCUMENTS

| | | | |
|---|---|---|---|
| 1,214,261 | 1/1917 | Balbach | 403/345 |
| 2,267,330 | 12/1941 | Goss | 403/334 X |
| 2,823,433 | 2/1958 | Kendall | 52/589 |
| 2,839,790 | 6/1958 | Collings | 52/589 |
| 2,895,753 | 7/1959 | Fentiman | 403/381 |
| 3,579,941 | 5/1971 | Tibbals | 52/593 X |
| 3,791,082 | 2/1974 | Bowling | 52/593 |
| 4,633,275 | 12/1986 | Hubbard et al. | 403/333 X |
| 4,807,416 | 2/1989 | Parasin . | |

FOREIGN PATENT DOCUMENTS

| | | | |
|---|---|---|---|
| 914370 | 4/1972 | Canada . | |
| 910153 | 11/1962 | United Kingdom | 403/364 |

*Primary Examiner*—Peter M. Cuomo
*Attorney, Agent, or Firm*—Townsend and Townsend

[57] ABSTRACT

A tongue and groove construction panel in which the tongue comprises a protruding extension formed on a first edge of the panel. The tongue has a head with chamfered sides that expand from a narrowed tip to a neck having essentially parallel sides. The neck merges into a shoulder portion having chamfered sides that expand to merge with the panel. The groove comprises a correspondingly shaped cavity formed on a second edge. The groove has a head with chamfered sides that expand from a base to a neck having parallel sides that merge into a shoulder portion having chamfered sides that expand to a groove opening. The tongue and groove have adjacent chamfered head and shoulder surfaces in an assembled joint. The chafered surfaces of the tongue are disposed at a more acute angle than the chamfered surfaces of the groove to leave spaces therebetween in an assembled joint. The tongue tip is substantially smaller than the mouth of the groove opening to allow easy penetration of the tongue head into the groove shoulder. Furthermore, the tongue tip is substantially smaller than the neck of the groove to allow easy penetration of the tongue head into the groove neck.

7 Claims, 1 Drawing Sheet

TONGUE AND GROOVE PROFILE

FIELD OF THE INVENTION

This invention relates to wood based panels having a tongue and groove configuration on their side edges. The tongue and groove arrangement of the present invention can be formed on plywood panels, oriented strandboard, waferboard, particleboard and fiberboard.

BACKGROUND OF THE INVENTION

Wood based panels are commonly used in building industry as floor sheathing and flat roof sheathing. When used in these applications, panels are preferably formed with some sort of tongue and groove profile to allow for quick and efficient interlocking of the panels during construction. The panels span the distance between supporting joists with the interlocking tongue and groove side edges of adjacent panels serving to support the panels against deflection between the joists while the end edges of the panels are located over and supported by the joists.

Canadian Patent 914,370 which issued to applicant discloses a tongue and groove profile for a plywood panel suitable for use as a floor or flat roof panel. Patent 914,370 discloses a tongue and groove profile in which the inner walls of the groove are essentially parallel except for the inner most region adjacent the groove base adapted to accommodate the tongue tip. The opening or clearance of the groove is only slightly larger than the thickness of the tip of the tongue. As a result of this arrangement, it can become very difficult to insert the tongue into the groove during the installation process, particularly if the panel edges are slightly wavy or bowed or if the edge profiles are swollen due to an increased moisture content.

U.S. Pat. No. 4,807,416 which also issued to applicant, discloses a tongue and groove profile having a twin wedge configuration that makes the installation of a swollen profile easier. However, as the resulting joint dries out after installation, the tongue will tend to shrink creating play in the joint that leads to differential deflections between the profiled edges of adjacent panels, greater than acceptable for flooring type of panels.

Also, some profiles used in oriented strandboard and waferboard are of a single wedge-like shape and while they make the installation of a swollen profile somewhat easier, the swelling prevents the tongue from reaching the bottom of the groove and after drying out while installed, a large tolerance between the groove and tongue results, and may cause excessive differential deflections between the profiled edges of the adjacent panels, unacceptable or undesirable for flooring applications.

SUMMARY OF THE INVENTION

The present invention provides a tongue and groove construction panel that addresses the problems of the prior art.

The present invention provides a tongue and groove construction panel in which the tongue comprises a protruding extension formed on a first edge of the panel having a head with chamfered sides that expand from a narrowed tip to a neck having essentially parallel sides, said neck merging into a shoulder portion having chamfered sides that expand to merge with the panel, and the groove comprises a correspondingly shaped cavity formed on a second edge having a head with chamfered sides that expand from a base to a neck having parallel sides that merge into a shoulder portion having chamfered sides that expand to a groove opening, said tongue and said groove having adjacent chamfered head and shoulder surfaces in an assembled joint, said chamfered surfaces of said tongue being disposed at a more acute angle than the chamfered surfaces of said groove to leave spaces therebetween in an assembled joint.

The tongue and groove panel of the present invention incorporates an edge profile that performs significantly better than previous profiles used until now on wood based panel products. A panel according to the present invention facilitates very easy installation of profiled panels while limiting the differential deflection between edges of adjacent panels to a minimum. Using the edge profile of the present invention, even panels with bowed, somewhat wavy or swollen, or with slightly damaged edges can be easily interlocked together.

Wood based panels constructed according to the present invention find particular application as floor and flat roof sheathing in that easy installation is permitted, considerable loads are transferred by the tongue and groove joint, and the differential deflection between edges of joined panels is minimal.

BRIEF DESCRIPTION OF THE DRAWINGS

The present invention is illustrated, merely by way of example, in the accompanying drawings in which.

DESCRIPTION OF THE PREFERRED EMBODIMENT

Figure 1:
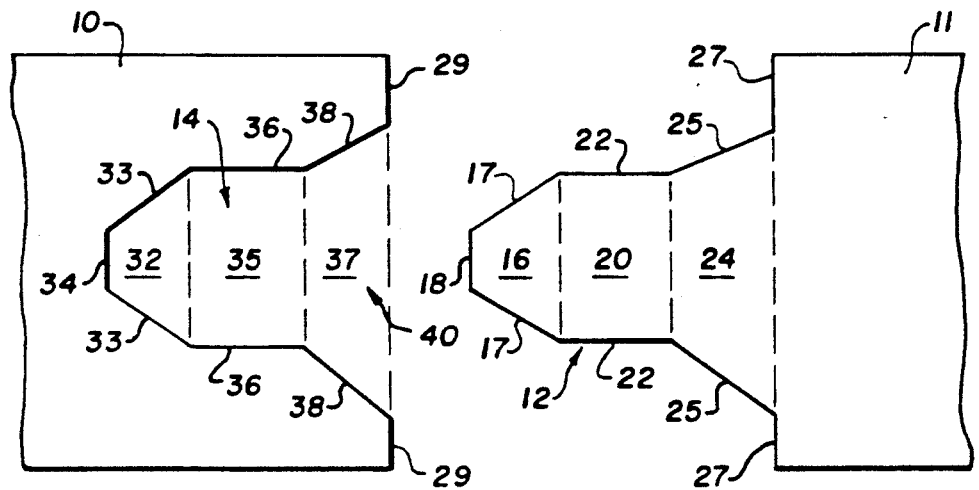
FIG. 1 shows the tongue and groove edges of a preferred embodiment of the present invention.

Referring to FIG. 1, there are shown two panels 10 and 11 which are similar in all respects, each having a tongue 12 along one side edge and a groove 14 formed in the opposite side edge.

Tongue 12 comprises a protruding extension formed on a first edge of panel 11. There is a head 16 with chamfered sides 17 that expand from a narrowed tip 18 to a neck 20 having essentially parallel sides 22. Neck 20 merges into a shoulder portion 24 having chamfered sides 25 that expand to merge with the side edge 27 of panel 11.

Groove 14 is a correspondingly shaped cavity to accept tongue 12 formed along side edge 29 of panel 10. Panel 10 has a matching tongue formed on its opposite side edge, just as panel 11 has a matching groove formed on its opposite side edge. Groove 14 is formed with a head 32 having chamfered sides 33 that expand from a base 34 to a neck 35 having parallel sides 36 that merge into a shoulder portion 37 having chamfered sides 38 that expand to a groove opening 40.

Figure 2:
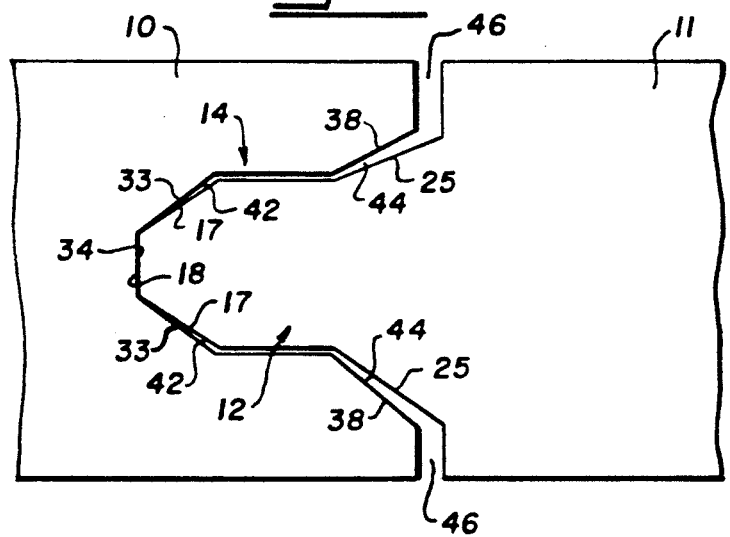
FIG. 2 shows the panels of FIG. 1 after assembly.

FIG. 2 shows panels 10 and 11 in an assembled state. Tongue 12 and groove 14 have adjacent chamfered head surfaces 17 and 33, and shoulder surfaces 25 and 38 in an assembled joint. The chamfered surfaces of tongue 12 are disposed at a more acute angle than the chamfered surfaces of groove 14 to leave spaces therebetween in an assembled joint.

In the profile of the present invention, tongue tip 18 is substantially smaller than mouth 40 of the groove opening to allow easy penetration of the tongue head 16 into the groove shoulder area 37. The wide mouth 40 with its inwardly directed sides 38 ensures that tongue head 16 is aligned for groove neck 35. This also allows for an easy initial penetration of the tongue head into the shoulder of the groove even when the profiles are swollen, wavy, bowed or slightly damaged.

In addition, tongue tip 18 is substantially smaller than the neck 35 of groove 14 to allow easy penetration of the tongue head into the groove neck.

In an assembled joint, the adjacent essentially parallel sides of tongue neck 20 and groove neck 35 cooperate to act as load bearing surfaces to prevent undesirable movement of one panel edge with respect to the engaged adjacent panel edge. The design of the present tongue and groove profile is such that tongue neck 20 is always able to engage in groove neck 35 to some extent even if tongue 12 is swollen to prevent full penetration.

When assembling joints, glue may be applied to the tongue and groove profiles, the application of glue is optional. The spaces 42 between the tongue head and the groove head chamfered surfaces define a gap to accommodate excess glue. Alternatively, if glue is not used, space 42 will accommodate debris and dirt which may be pushed forward by the penetrating tongue.

Adjacent chamfered tongue shoulder surfaces 25 and groove shoulder surfaces 38 define spaces 44 to accommodate panel expansion and contraction in an assembled joint.

In addition, tongue 12 is preferably longer than groove 14 is deep such that when tongue tip 18 engages groove base 34 spaces 46 are created between joined panel edges 27 and 29 to allow for further expansion and contraction of the joint.

It will be understood that the tongue and groove profile of the present invention can be used on a variety of wood based panel products such as plywood, oriented strandboard (OSB), waferboard, particleboard and fiberboard. In the case of plywood and OSB, the face grain is usually positioned perpendicular to a series of supporting joists. In the case of waferboard and other panels, the length of the panel is positioned perpendicular to the joists. The panel ends are located over and joined at the joists. The tongue and groove profiles of the present invention are provided along the longer edges of adjacent panels to interlock the panels together and also serve to transfer the load from one panel to another thereby increasing the edge stiffness of the system, lowering the overall deflection of the edge portions of the panels and preventing excessive deflection of one panel edge with respect to the adjacent panel edge. If not controlled, excessive deflection may can lead, through a scissor effect, to cutting of finishing material laid on the panels.

Although the present invention has been described in some detail by way of example for purposes of clarity and understanding, it will be apparent that certain changes and modifications may be practiced within the scope of the appended claims.

I claim:

1. A tongue and groove construction panel in which the tongue comprises a protruding extension formed on a first edge of the panel having a head with chamfered sides that expand from a narrowed tip to a neck having essentially parallel sides, said neck merging into a shoulder portion having chamfered sides that expand to merge with the panel, and the groove comprises a correspondingly shaped cavity formed on a second edge having a head with chamfered sides that expand from a base to a neck having parallel sides that merge into a shoulder portion having chamfered sides that expand to a groove opening, said tongue and said groove being dimensioned to interfit such that the neck of said tongue fits within the neck of said groove with clearance and adjacent chamfered head and shoulder surfaces in an assembled joint are spaced apart to leave gaps about said tongue to ensure ease of insertion.

2. A tongue and groove panel as claimed in claim 1 in which said tongue tip is substantially smaller than the mouth of said groove opening to allow easy penetration of said tongue head into the groove shoulder.

3. A tongue and groove panel as claimed in claim 1 in which said tongue tip is substantially smaller than the neck of said groove to allow easy penetration of the tongue head into the groove neck.

4. A tongue and groove panel as claimed in claim 1 in which said adjacent chamfered tongue head and groove head surfaces define a gap to accommodate excess glue in an assembled joint.

5. A tongue and groove panel as claimed in claim 1 in which said adjacent chamfered tongue shoulder and groove shoulder surfaces define a gap to accommodate panel expansion and contraction in an assembled joint.

6. A tongue and groove panel as claimed in claim 1 in which said tongue is longer than said groove is deep such that when said tongue tip engages said groove base a space is created between the joined edges of the panels to allow for expansion and contraction.

7. A tongue and groove panel as claimed in claim 1 in which said tongue and groove are formed with load bearing surfaces comprising the parallel sides of said tongue and groove neck.

* * * * *